(12) United States Patent
Van der Velden

(10) Patent No.: US 9,582,519 B2
(45) Date of Patent: Feb. 28, 2017

(54) PATTERN-ENABLED DATA ENTRY AND SEARCH

(71) Applicant: Dassault Systèmes Simulia Corp., Providence, RI (US)

(72) Inventor: Alexander Jacobus Maria Van der Velden, Atlanta, GA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 257 days.

(21) Appl. No.: 13/967,612

(22) Filed: Aug. 15, 2013

(65) Prior Publication Data
US 2015/0052163 A1    Feb. 19, 2015

(51) Int. Cl.
G06F 3/048    (2013.01)
G06F 17/30   (2006.01)

(52) U.S. Cl.
CPC ... G06F 17/30277 (2013.01); G06F 17/30572 (2013.01); G06F 17/30991 (2013.01); G06F 17/30994 (2013.01)

(58) Field of Classification Search
CPC ............... G06F 17/30277; G06F 17/30994; G06F 19/26; G06F 17/30572; G06F 17/30991; Y10S 715/968
USPC ............................. 715/855; 345/440; 707/737
See application file for complete search history.

(56) References Cited

U.S. PATENT DOCUMENTS

| | | | |
|---|---|---|---|
| 8,024,651 B1 * | 9/2011 | Error | G06F 17/30994 715/212 |
| 2001/0055018 A1 * | 12/2001 | Yaginuma et al. | 345/440 |
| 2003/0142094 A1 * | 7/2003 | Zhang | 345/440 |
| 2004/0193598 A1 * | 9/2004 | Kan et al. | 707/6 |
| 2005/0091263 A1 * | 4/2005 | Wallace | G06F 17/30398 |
| 2009/0324035 A1 | 12/2009 | Wengler et al. | |
| 2011/0037766 A1 | 2/2011 | Judy et al. | |
| 2012/0105453 A1 * | 5/2012 | Cardno et al. | 345/440 |
| 2012/0254790 A1 | 10/2012 | Colombino et al. | |

(Continued)

FOREIGN PATENT DOCUMENTS

EP    1 400 902 A1    3/2004

OTHER PUBLICATIONS

Peltarion Synapse v. 1.2, Peltarion Corporation 2006, screenshots from working program, pp. 1-14.*

(Continued)

*Primary Examiner* — Patrick Riegler
*Assistant Examiner* — Alex Olshannikov
(74) *Attorney, Agent, or Firm* — Hamilton, Brook, Smith & Reynolds, P.C.

(57) ABSTRACT

In the proposed approach cluster elements (bins) are made available as a keypad in the form of a cluster map. The user directly selects the cluster element (bin) with a mouse, touch or actual keypad. For each of the associated attributes, a cluster map is available that orders the attributes from high-to-low by color or shade intensity. When a cluster element is selected in one cluster map, that same cluster element is also highlighted in other cluster maps. For each of the cluster maps, a value axis is available which shows the value of the parameter for the selected cluster element. In the case of numerical values, the high/low attribute pattern across the cluster maps is easily visible. The selected data objects in the cluster map are displayed in a separate widget.

22 Claims, 9 Drawing Sheets

(4 of 9 Drawing Sheet(s) Filed in Color)

(56) References Cited

U.S. PATENT DOCUMENTS

2012/0278752 A1 11/2012 Parker
2012/0311637 A1* 12/2012 Anthru .................. H04N 5/445
                                                        725/44

OTHER PUBLICATIONS

SOM View visualizer—Piki, Peltarion Corporation, last modified Jun. 19, 2008 at http://www.peltarion.com/doc/index.php?title=Synapse:SOM_View_visualizer.*
Viscovery SOMine version 5.2.2, Viscovery Software 1998-2011, screenshots from working program, pp. 1-3.*
European Search Report, EP 14168668.3, "Pattern-Enabled Data Entry and Search," dated Jan. 19, 2015.
Daniel Arribas-Bel, et al., "Multidimensional urban sprawl in Europe: A self-organizing map approach", *Computers, Environment and Urban Systems,* vol. 35, No. 4, pp. 263-275 (2011).
Lin, Xia, et al., "A Self-organizing Semantic Map for Information Retrieval", *Proc. Annual Int'l ACM/SIGIR Conf on Res. & Dev. in Information Retrieval,* vol. 14, pp. 262-269 (1991).
Lin, Xia, "Map Displays for Information Retrieval", *J. Am. Soc. Information Science,* vol. 48, No. 1, pp. 40-54 (1998).

* cited by examiner

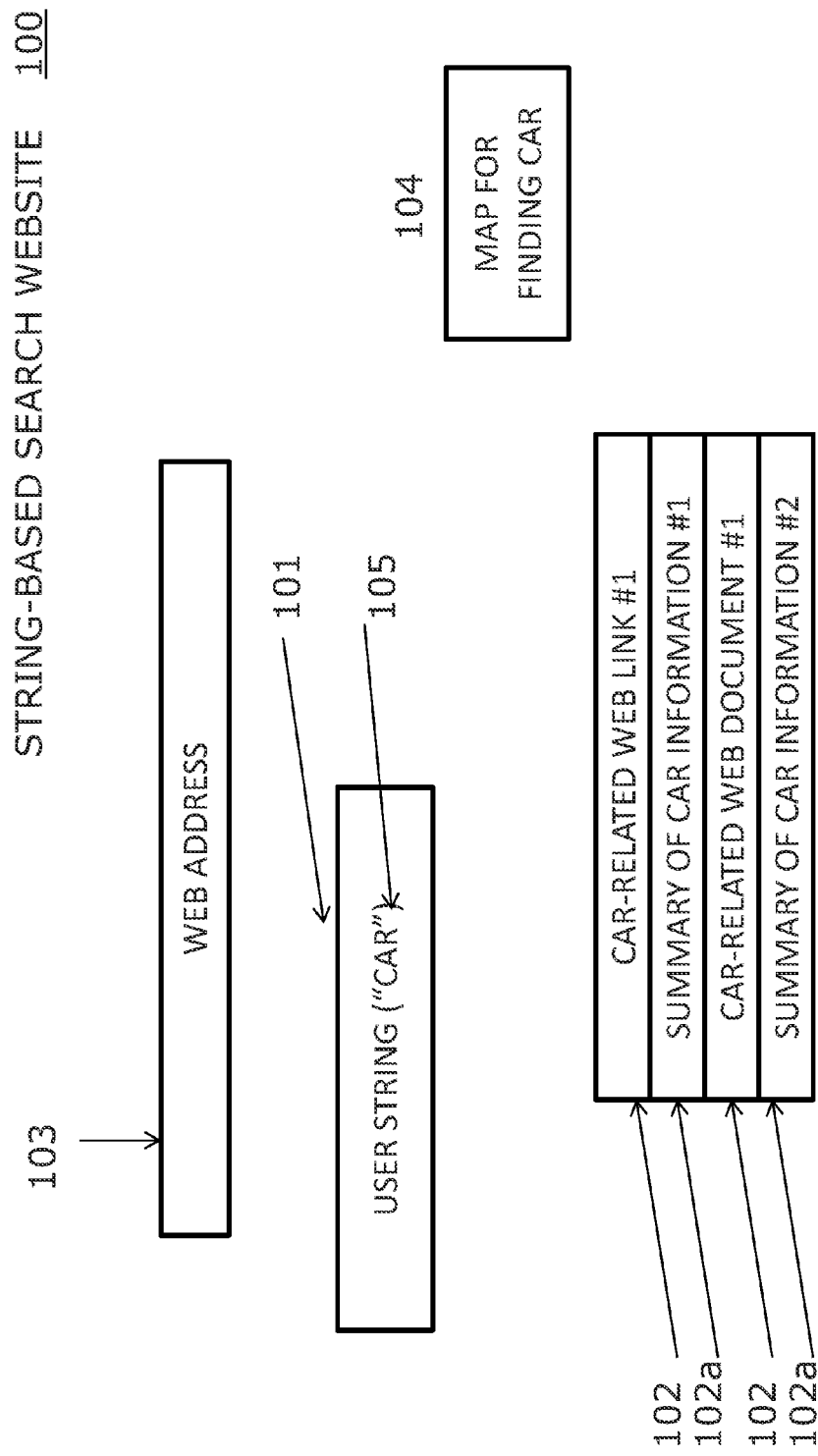
FIG. 1A – PRIOR ART

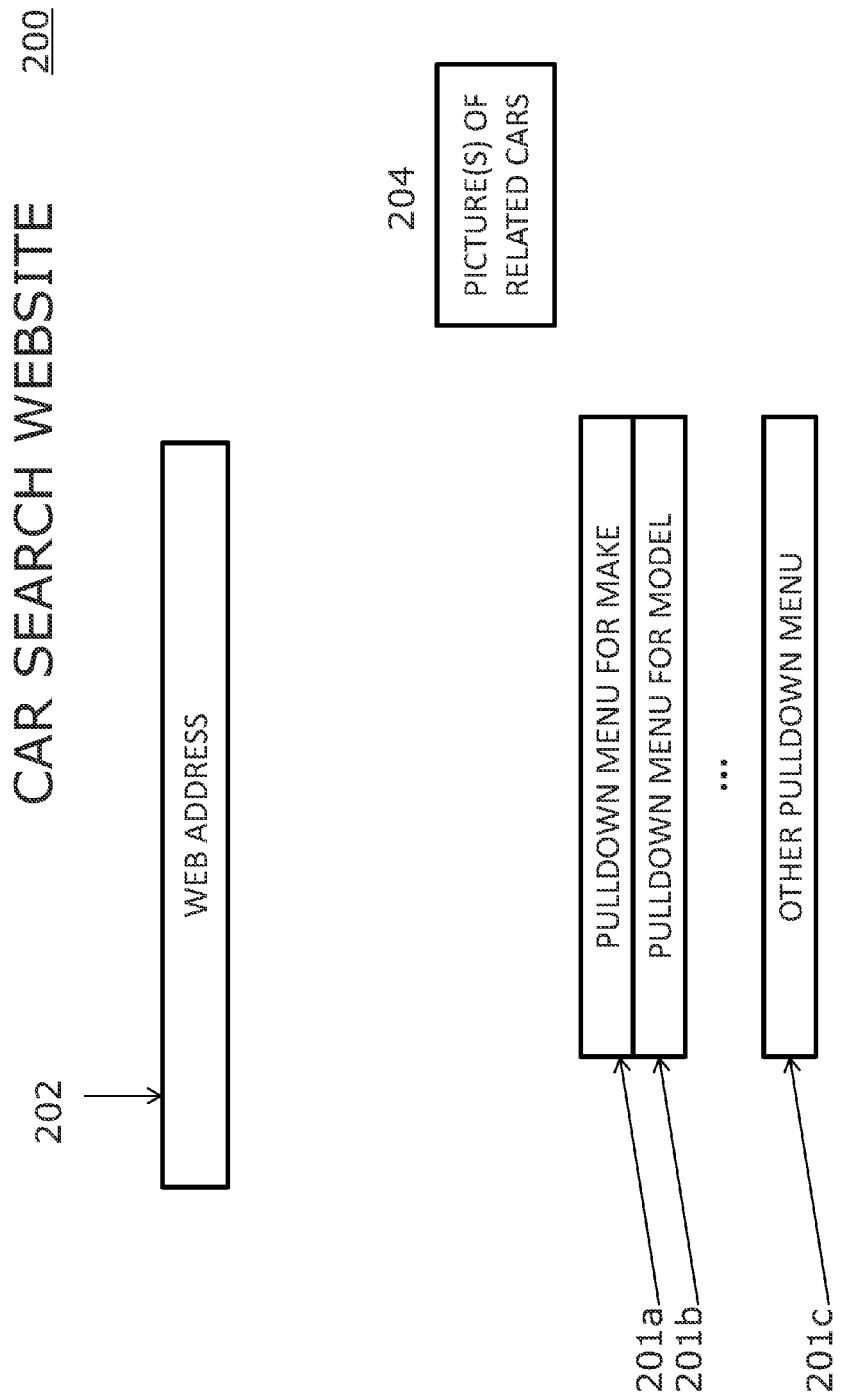
FIG. 1B – PRIOR ART

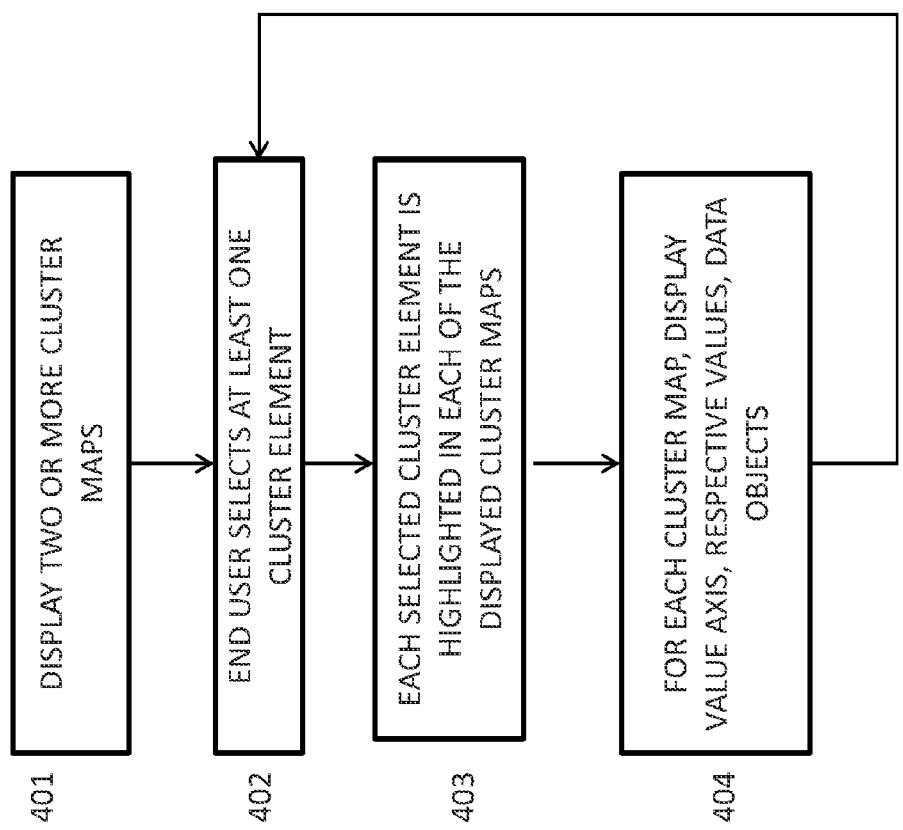

PATTERN-ENABLED DATA ENTRY AND SEARCH

BACKGROUND OF THE INVENTION

A computer network search may be based on strings typed in by an end-user, using a search engine, such as GOOGLE™, YAHOO™, or another string-based web search engine. This type of search technology is focused on relating the meaning of the input strings to known documents that are then ranked by relevance. Though this is powerful in terms of textual information, it tends to be very limiting in terms of trading off attributes.

For instance, when a user types "car" into a string-based web search engine, he may see all sorts of information related to cars, including where he can rent cars and purchase cars. A website link may also be displayed that describes what a car is. When a user reads through all of the documents on the websites returned in search results and displayed by a string-based web search engine, the user may get an idea of the type of car that he is interested in.

Another technology is search based on similar clusters, in which data is sorted in clusters/bins prior to search. A good example of search based on similar clusters is using a car-related search website, such as the Edmunds website, and websites of car dealers. A car-related search website allows a user to select cars out of different overlapping bins, such as an SUV, wagon, sedan, mid-size, van, used, new, make, or model. When a user selects an SUV, the user may choose based upon price range or feature set. In this respect, the user receives a richer "car information" experience with a car search website than with a string-based web search engine. However, with a typical car search website, a user has to go through several car descriptions before finding something that he is satisfied with.

SUMMARY OF THE INVENTION

Existing solutions like a string-based search or data value filters and/or bins do not let the user experience make tradeoffs between attributes. In addition, existing data clustering techniques show similarity in patterns very well, but become less useful when patterns in maps are not similar (different scales and orientation), or when the number of dimensions (e.g., numbers of maps) is high (>4), or when it is important to know exact values. As a consequence, there exist no satisfactory tools to trade off or search for patterns of attributes.

The proposed approach provides a framework in which the user may search through patterns and trade off between attributes. In the proposed approach, cluster elements (bins) are made available as a keypad in the form of a cluster map. The user directly selects the cluster element with a mouse, touch or actual keypad. For each of the associated attributes, a cluster map is available that orders the attributes from high-to-low by color or shade intensity. As a result, there are as many (multiple) cluster maps as there are attributes. When a cluster element is selected in one cluster map, that same cluster element is also highlighted in the other cluster maps. For each of the cluster maps, a value axis is available which shows the value of the corresponding parameter for the selected cluster element. In the case of numerical values, the high/low attribute pattern across the cluster maps is easily visible. The selected data objects in the cluster map are displayed in a separate widget.

Using the proposed approach, a user may look at all available options and trade off attributes to make a selection that matches the user's requirements. The user's requirements need not be formally defined before the search. A given user may see what is available, what he likes best, and where to find it.

The proposed approach includes a computer-implemented method providing multi-dimensional pattern-enabled searching. The computer-implemented method may display at least two cluster maps, each cluster map corresponding to a respective attribute. Each cluster map may comprise one or more cluster elements. The proposed approach enables an end user to select a cluster element in at least one of the displayed cluster maps. The user-selected cluster element may be automatically or responsively highlighted in each of the displayed cluster maps. For each displayed cluster map, the respective attribute may be represented by displaying a value axis and respective values on the value axis for the selected cluster element highlighted in the displayed cluster map. In this way, across the multiple cluster maps, the corresponding parameter values are displayed as the respective attributes of the selected cluster element.

The computer-implemented method may include each cluster map being a self-organizing map. The computer-implemented method may display one or more data objects corresponding to the selected cluster element. The computer-implemented method may include the displayed values as at least one of: a numerical value, a string, a parameter, a color, a symbol, a size, a shape, a picture, a two-dimensional picture, a three-dimensional picture, a four-dimensional picture, or a video.

The computer-implemented method may include each cluster map and the value axis for the selected cluster element in each cluster map as displayed in a leaves-on-a-branch or a flower layout. The computer-implemented method may include each cluster element representing a bin with a range of values for the respective attribute.

The computer-implemented method may include the respective cluster elements being arranged within each cluster map in a high-to-low order. The computer-implemented method may include the respective cluster elements as arranged within each cluster map in a high-to-low order by one of: color or shade intensity. The computer-implemented method may include the respective attribute with an indication of an amount of data available about each respective cluster map.

The computer-implemented method may further include selecting multiple cluster elements and highlighting the multiple selected cluster elements in each of the displayed cluster maps. For each displayed cluster map, the computer-implemented method may represent the respective attribute by displaying an individual value axis and respective values on the individual value axis for each of the multiple selected cluster elements highlighted in the displayed cluster map.

The proposed approach may include a computer-implemented system providing multi-dimensional pattern-enabled searching. The computer-implemented system may comprise a display module configured to display at least two cluster maps, each cluster map corresponding to a respective attribute. Each cluster map may comprise one or more cluster elements. The computer-implemented system may further include a selection module which enables an end user to select a cluster element in at least one of the displayed cluster maps. The computer-implemented system may further include a highlighting module configured to responsively and/or automatically highlight the user-selected cluster element in each of the displayed cluster maps. The display module may be further configured to represent the respective attribute for each displayed cluster map by displaying a value axis and respective values on the value axis for the selected cluster element highlighted in the displayed cluster map.

The computer-implemented system may include each cluster map being a self-organizing map. The computer-implemented system may include the display module being further configured to display one or more data objects corresponding to the selected cluster element. The computer-implemented system may include the displayed values being at least one of: a numerical value, a string, a parameter, a color, a symbol, a size, a shape, a picture, a two-dimensional picture, a three-dimensional picture, a four-dimensional picture, or a video.

The computer-implemented system may include the display module as configured to display each cluster map and the value axis for the selected cluster element in each cluster map in a leaves-on-a-branch or a flower layout. The computer-implemented system may include each cluster element representing a bin with a range of values for the respective attribute. The computer-implemented system may include the display module as configured to display the respective cluster elements as arranged within each cluster map in a high-to-low order.

The computer-implemented system may include the display module as configured to display the respective clusters as arranged within each cluster map in a high-to-low order by one of: color or shade intensity. The computer-implemented system may include the display module as further configured to display, for each respective attribute, an indication of an amount of data available about each respective cluster map.

The selection module of the computer-implemented system may be further configured to select multiple cluster elements. The highlighting module of the computer-implemented system may be further configured to automatically highlight the multiple selected cluster elements in each of the displayed cluster maps. The display module may be further configured to represent the respective attribute by displaying an individual value axis and respective values on the individual value axis for each of the multiple selected cluster elements highlighted in the displayed cluster map.

The proposed approach may include a non-transitory computer readable medium having stored thereon a sequence of instructions. The medium, when loaded and executed by a processor coupled to an apparatus may cause the apparatus to perform the following steps. The apparatus may display at least two cluster maps, each cluster map corresponding to a respective attribute, each cluster map comprising one or more cluster elements. The apparatus may enable an end user to select a cluster element in at least one of the displayed cluster maps. The apparatus may responsively highlight the user-selected cluster element in each of the displayed cluster maps. For each displayed cluster map, the apparatus may represent the respective attribute by displaying a value axis and respective values on the value axis for the selected cluster element highlighted in the displayed cluster map.

The proposed approach is applicable to any field but particularly to engineering systems, business intelligence, and consumer retailers (both online and on-premise).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A illustrates a prior art string-based search website.

FIG. 1B illustrates a prior art similar-cluster based car search website.

FIG. 4 illustrates a high-level flowchart of steps of the present invention.

DETAILED DESCRIPTION OF THE INVENTION

Figure 2A:
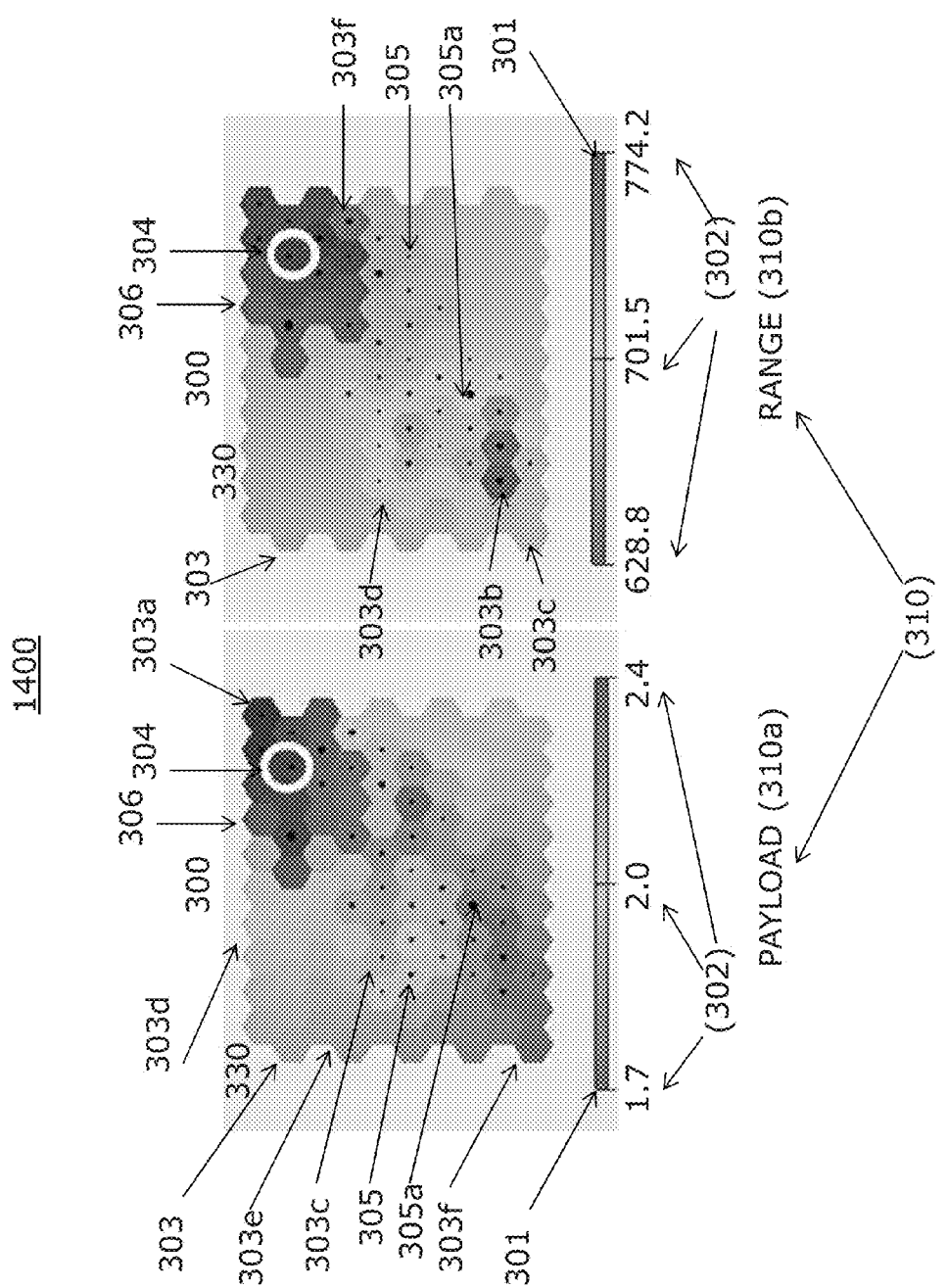
FIG. 2A shows a representation of two cluster maps in one embodiment of the present invention.

A description of example embodiments of the invention follows.

As previously described in the background, a search may be made based on strings typed in by the end-user. FIG. 1A illustrates a prior art string-based search website 100, at web address 103, with the input search string "car" 105 typed into a search bar or search criteria field 101. This type of search technology is focused on relating the meaning of the input strings 105 to document summaries 102a, to documents, or to links to known documents 102 that are then ranked by relevance. The string-based search engine may also provide a map 104 for the geographic location of the desired item (the car).

As previously described in the background, a search may also be made based upon similar clusters 200, shown in FIG. 1B, in which data is sorted in clusters/bins prior to the search. A "car" search website 200 at a given web address 202 may display pictures of cars 204 and may allow a user to select cars out of different overlapping bins 201, such as make 201a, model 201b, SUV, wagon, sedan, mid-size, van, used, new, or another pull-down menu 201c. However, with a typical car search website 202, a user has to go through several car descriptions include pictures of related cars 204 before finding something that he is satisfied with.

By contrast with the present invention, both the prior art approaches of FIGS. 1A and 1B fail to allow a framework to trade off multiple attributes or search for patterns of multiple attributes. Tradeoffs between attributes are often critical for making design related decisions.

Tradeoffs are exhibited with most attributes, whether in nature, life or designed products, either due to evolution or optimization. For instance, one military tank may have thick armor, low mobility, and a large gun, but another military tank may have thin armor, high mobility, and a medium-sized gun.

Natural attributes exhibit tradeoff patterns as well. Because a cheetah relies on speed and acceleration and surprise to catch a deer, it has a light low-fat muscular build and only operates in flat land with tall grass and needs to eat every day. A 15 foot python may catch and digest a deer once a year, but it does so with minimal movement.

Trading off between attributes in a novel way is accomplished by the proposed approach through using maps. A map is a well understood medium for relating patterns. For example, GOOGLE MAPS™ brings elements together that are close to each other in terms of geographic space (e.g., roads, restaurants and other places of interest).

However, the map concept may be extended to abstract information, including but not limited to, maximum speed, weight, and cost, etc. This technology is called a "self organizing map." A self organizing map (SOM) is a type of discrete visual representation that reduces dimensions visible to the user (typically two dimensions) and plots data similarities by grouping together similar items. The SOM is often a type of artificial neural network (ANN) that produces a low-dimensional (typically two dimensional) discrete representation of samples.

FIG. 2A shows a representation of two cluster maps 300 in one embodiment of the present invention. In reference to FIGS. 2A-3B, operations are performed by the processor, apparatus, or computer system 1400 of the present invention, except where indicated as performed by the user. The present invention implements the cluster maps 300 as self-organizing maps. However, the present invention is not limited to using only self-organizing maps as cluster maps 300 and may use other types of cluster maps.

FIG. 2A shows the performance of aircraft designed for a specific weight class, although the embodiments described herein are not limited to such use. A processor, apparatus or computer system 1400 of the present invention automatically clusters the aircraft in a plurality of hexagonal cluster elements 303 based on payload 310a (number of passengers) and range 310b. Each cluster element 303 represents a bin with a range of data values. The processor/system places aircraft that are similar in these two attributes (payload and range) 310a, 310b, either in the same or adjacent cluster. Through a user interface, a user selects, for example, the top right aircraft cluster element 303, resulting in a selected cluster element 304 illustrated by a white selection circle. The selected cluster element 304 has aircraft that have a high payload 310a, but a low range 310b. For cluster elements with data, the system 1400 displays a black dot 305 within the hexagonal shape of the cluster. The more data, the bigger the dot that the system 1400 displays. For example, a bigger black dot is shown as 305a. Some cluster elements are empty, but their interpolated values are still interesting because such regions may motivate the creation of more detailed data.

Each cluster map 300 is shown to have a respective attribute 310 (such as 310a, 310b in FIG. 2A). For two dimensions (range 310b, payload 310a) the tradeoff is clear to a user. A given point cluster element on the cluster map 300 may have high payload 310a and low range 310b or low payload 310a and high range 310b.

In the proposed approach in FIG. 2A, each cluster element 303 of the cluster map 300 is made available for selection to the user through a keypad 330 (i.e. graphical user interface). Each cluster map 300 has a corresponding keypad 330 which includes a plurality of buttons 306 in the above non-limiting example, illustrating a hundred (but not limited to one hundred) buttons 306, where each given button 306 corresponds to a given cluster element 303. In the FIG. 2A example, each button 306 is hexagonal in shape. However, there is no limitation on the size or shape of each button 306, and button shape may include, but is not limited to, a circle, square, ellipse, or hexagon. The number of buttons 306 is similarly not limited to that shown in FIG. 2A.

As further illustrated in FIG. 2A, each button 306 may have a corresponding color (or shade) for each cluster element 303. As shown in FIG. 2A, cluster elements may be colored, but are not limited to the colors of, purple 303a, red 303b, orange 303c, yellow 303d, green 303e, blue 303f, and/or other colors. Either color or shade intensity may be used to distinguish between the cluster elements 303. Each attribute 310 (collectively 310a, 310b in FIG. 2A) may have a respective corresponding value axis 301 which may have a set of values 302 associated with the color or shade intensity for each of the cluster elements 303. Although the value axis 301 is represented as a line in FIG. 2A, it may alternatively be represented as any other form, such as a circle, square, rectangle, numerical value, string, parameter, color, symbol, picture of two, three, or four dimensions, of any size or shape.

The benefit of these types of cluster maps 300 is that they are easily extensible to higher dimensions and lend themselves to arbitrary data sets. When cluster maps have similar patterns, it is easy to envision what happens as a user moves from one cluster element 303 to another cluster element 303 within a cluster map 300. However, when patterns are not similar, as is typical in the case of tradeoffs, it is extremely hard for a user to understand the tradeoffs.

Figure 2B:
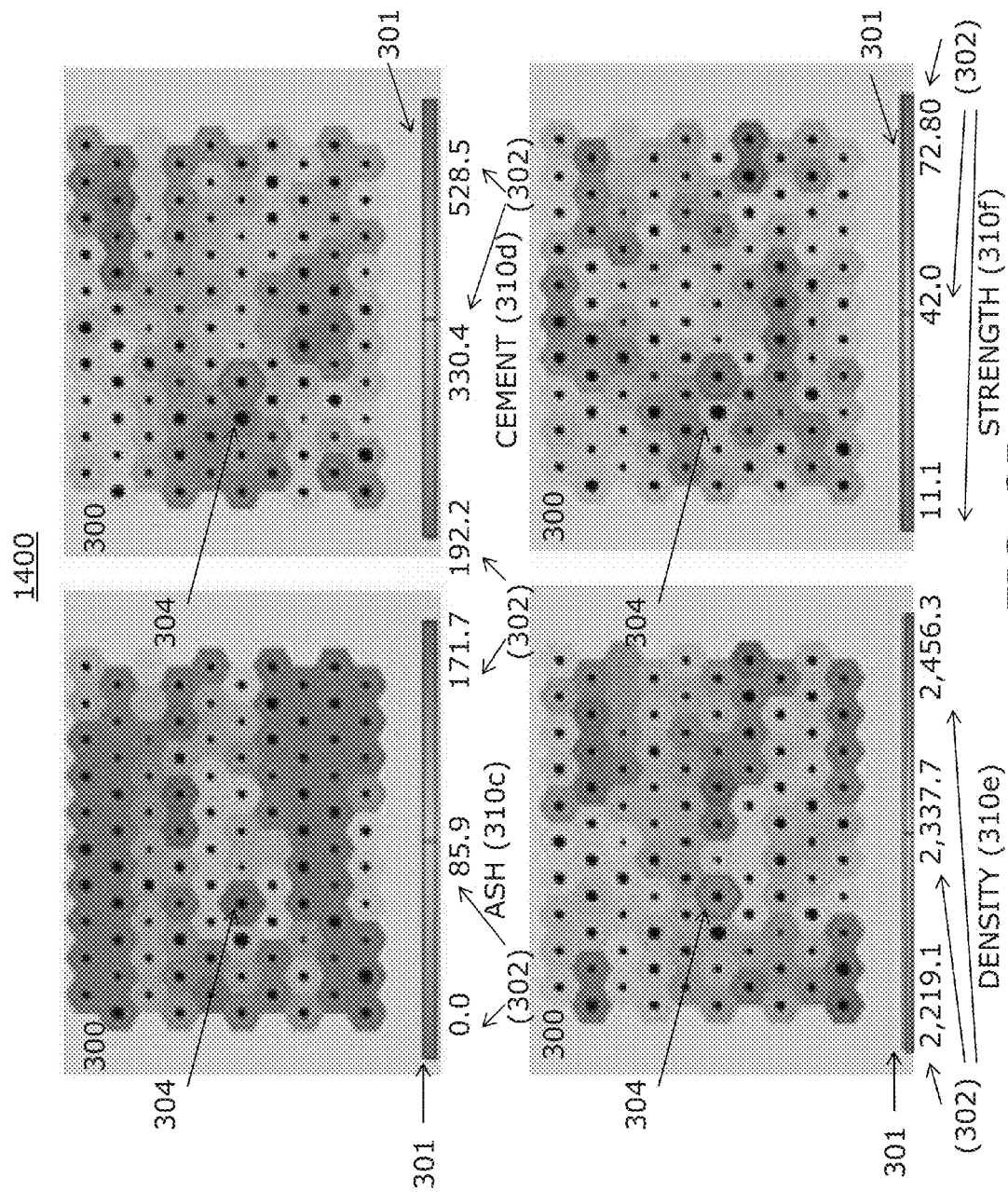
FIG. 2B illustrates a concrete mixture example, including four cluster maps in one embodiment of the present invention.

FIG. 2B illustrates a concrete mixture example, including four cluster maps 300 in one embodiment of the present invention. These cluster maps each have different attributes 310, including ash content 310c, cement mixture 310d, material density 310e, and material strength 310f. In this example, it is difficult to imagine how the values for the attributes 310 (collectively 310c, 310d, 310e, and 310f in FIG. 2B) change or trade-off as the cluster element selection 304 is moved. As FIG. 2B illustrates, it is a challenge for a user to pick a bin/cluster element 303 by performing an effective visual tradeoff. However, as illustrated in FIG. 3A to follow, the present invention overcomes this challenge.

Figure 3A:
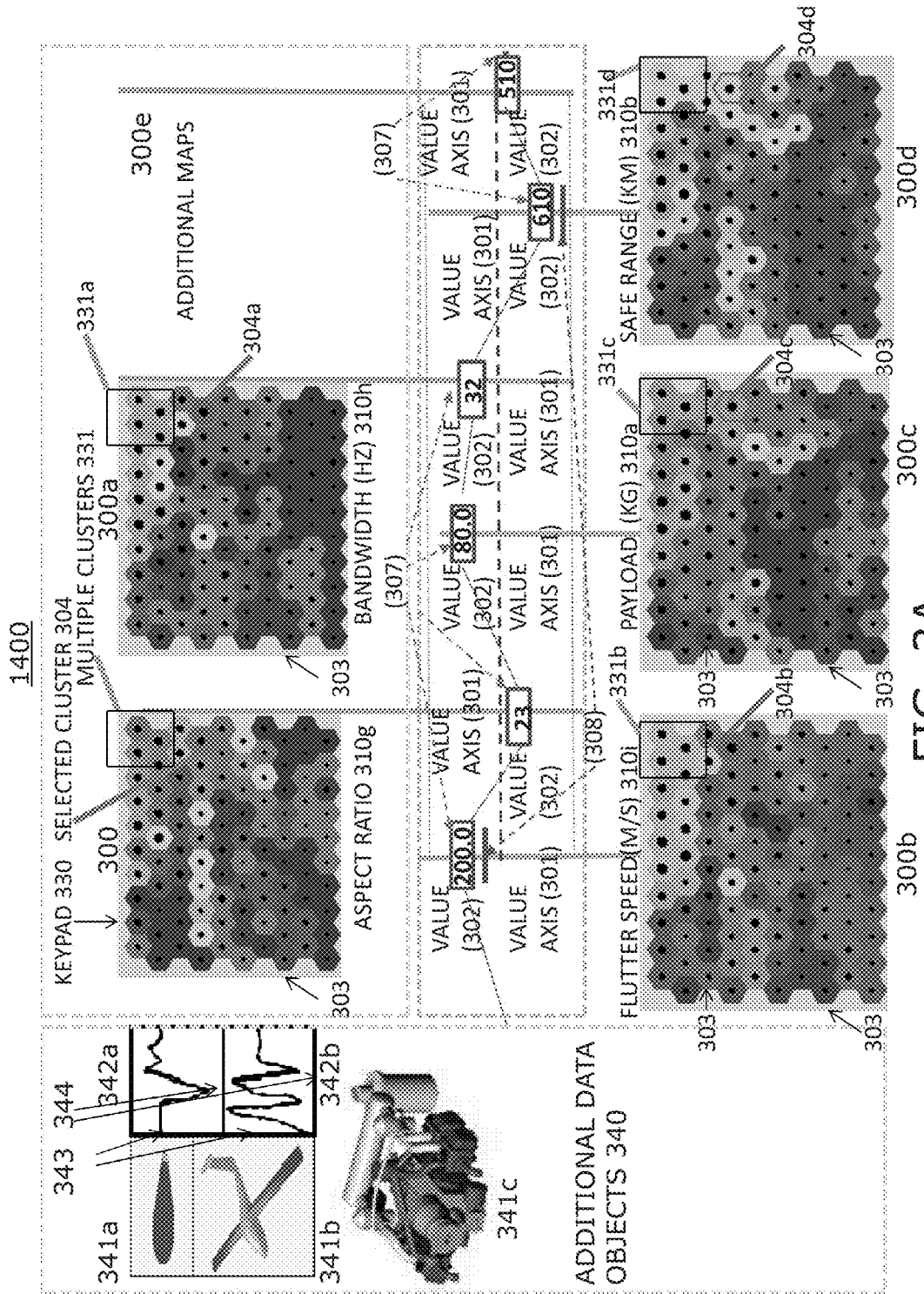
FIG. 3A shows a "leaves-on-a-branch" layout for the pattern enabled data entry and search interface in one embodiment of the present invention.

FIG. 3A shows a "leaves-on-a-branch" layout for the pattern enabled data entry and search in one embodiment of the present invention. As illustrated in FIG. 3A, the user may directly select one of the cluster elements 303, resulting in a cluster element selection 304 which is associated with a wide range of attributes 310, including, but not limited to, payload 310a, safe range 310b, aspect ratio 310g, bandwidth 310h, and flutter speed 310i. The selection may be performed by the user moving and/or clicking a mouse, touching a screen or keypad 330, or through other user-interface/user-interaction device means. For each of the attributes 310 (collectively 310a, 310b, 310g, 310h, and 310i in FIG. 3A) a respective cluster map 300 (respectively 300c, 300d, 300, 300a and 300b) is available that orders the attributes from high-to-low by color or shade intensity. As illustrated in FIG. 3A, when a cluster element selection 304 is performed by a user in one map 300, the system 1400 also responsively highlights the selected cluster element 304 (shown in pink) and the associated cluster elements (see 304a, 304b, 304c, 304d shown in pink) that are in the associated cluster maps (see 300a, 300b, 300c, 300d).

For each of the maps 300, 300a, 300b, 300c, 300d, and 300e, the system 1400 makes a value axis 301 available which shows the value 302 of the corresponding parameter for the selected cluster element 304. In FIG. 3A, the illustrated example value 302 is a numerical value, however, the value 302 alternatively may be a string, a parameter, a color, a symbol, a size, a shape, a picture, a two-dimensional picture, a three-dimensional picture, a four-dimensional picture, or a video.

As shown in FIG. 3A, for each attribute the system 1400 may display additional data objects 340, such as through a widget, and alternatively through other user interface means. In an exemplary embodiment, the system 1400 associates the retrieved data objects 340 with the attributes for the associated cluster maps (300, 300a, 300b, 300c, 300d, 300e). Alternatively, the system 1400 associates the retrieved data objects 340 with only the cluster map (300) for the selected cluster 304. The data objects 340 include, but are not limited to, attribute related data 342 (such as 342a, 342b shown in FIG. 3A), graphical representations 341 (such as 341a, 341b, 341c shown in FIG. 3A), or other types of data objects.

System 1400 may make multiple searched data objects 340 present and may indicate existence of data objects 340 by the size of the box (e.g., the purple box 307) around each given attribute value 302, and/or the numbers of lines (e.g., red lines 308) under the attribute values 302. In the illustrated example, red lines 302 are associated with flutter speed 310i and safe range 310b in FIG. 3A. Alternatively, other means may be used to indicate multiple searched data objects 340. In the case where values 302 are numerical, the high/low attribute pattern across the maps is easily visible. Attribute related data 342 (such as 342a, 342b shown in FIG. 3A) may have a Y-axis 343 parameter tracked with respect an X-axis 344 parameter, such as time, or some other parameter.

In FIG. 3A, the additional data objects 340 are used for user selection of a motor glider configuration with active flutter control. In response to user interaction (selection), system 1400 determines a cluster element 304 that maximizes payload 310a while not falling below a set flutter speed 310i and safe range 310b. The system retrieves data for the determined cluster element 304 and shows the wing geometry 342b (next to a wing graphical representation 341b) as well as the flutter CAE simulation with the selected system bandwidth 342a (next to a flutter graphical representation 341a). The retrieved data objects 340 also include a CAD visual 341c of the engine that is folded in the fuselage.

The patterns in FIG. 3A clearly visually indicate tradeoffs. A higher payload 310a translates into a lower safe range 310b. Higher system bandwidth 310h results in a higher flutter speed 310i. A higher aspect ratio 310g results in a lower flutter speed 310i (indicating that the structure is more stable).

In addition to single-cluster selection 304, multiple clusters may be user-selected 331, resulting in multiple sets of individual values 302 being highlighted. By selecting multiple clusters 331, system 1400 enables the user to visually and readily compare one cluster element with a given set of individual attribute values 302 against another cluster element with another set of individual attribute values 302. When multiple clusters 331 are selected in a given cluster map 300, the multiple clusters are also highlighted (see highlighted cluster elements 331a, 331b, 331c, 331d shown in FIG. 3A) in the other associated cluster maps (see cluster maps 300a, 300b, 300c, 300d shown in FIG. 3A).

Figure 3B:
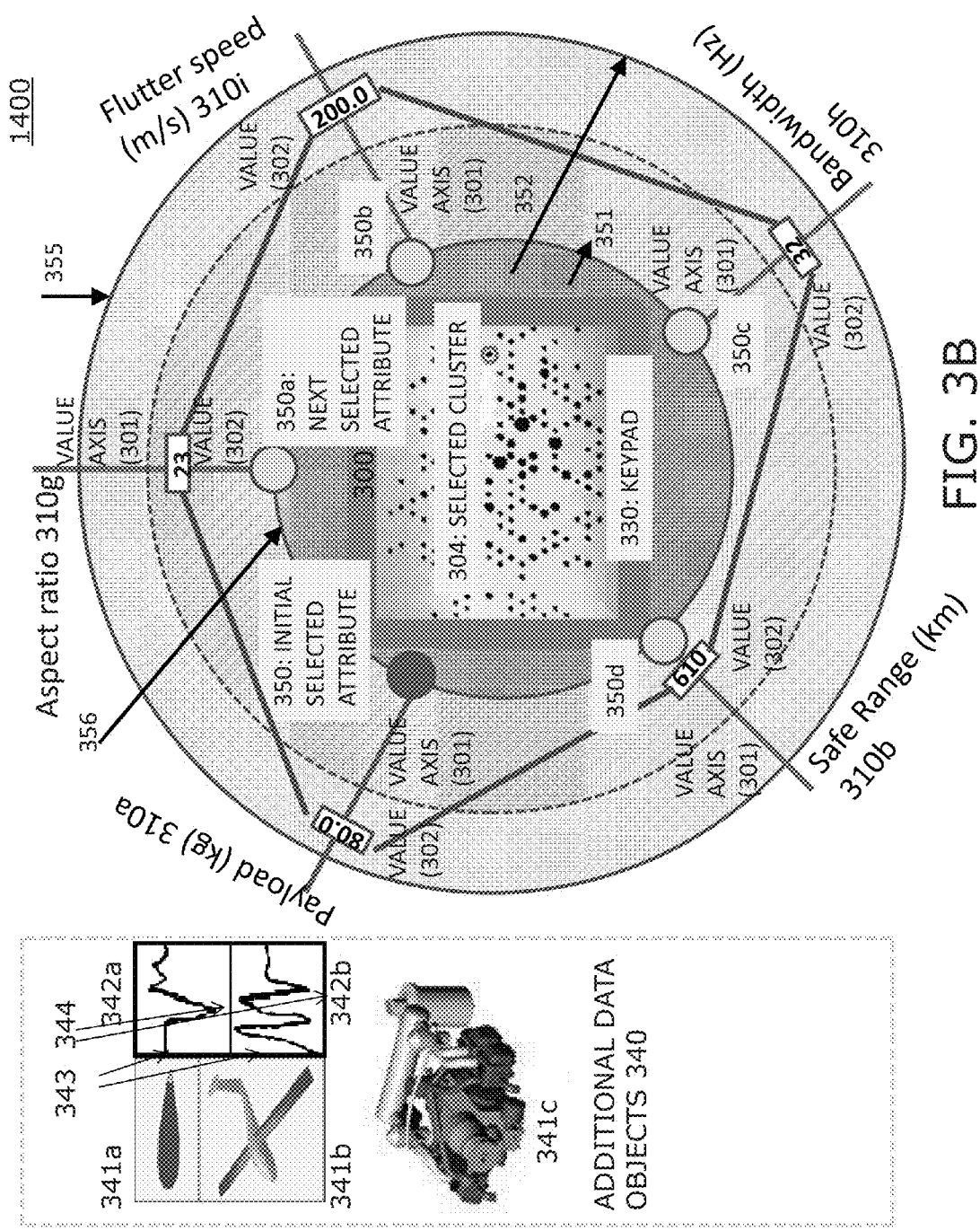
FIG. 3B shows a "flower" layout for the pattern enabled data entry and search interface in one embodiment of the present invention.

In addition to a "leaves-on-a-branch" layout, a "flower" layout may be employed. FIG. 3B shows a "flower" layout for the pattern enabled data entry and search in one embodiment of the present invention. FIG. 3B illustrates one central keypad 330 in the middle of the interface. The keypad 330 may be any form (round, square) and the keys may be of any form. The system 1400 may also maximize display details of the keypad to better allow bin selection by the user.

Each value axis 301 is in a common radar chart 355 for showing multi-variant data. Along each value axis 301, a value 302 with the smallest radius 351 from the center of the radar ring 355 denotes the lowest value, and a value with the largest radius 352 from the center of the radar ring 355 denotes the highest value. The user may select an attribute using a key ring 356 which connects a set of attributes 310 (which include, but are not limited to, payload 310a, safe range 310b, aspect ratio 310g, bandwidth 310h, or flutter speed 310i shown in FIG. 3B). When the user selects a cluster 304 inside the cluster map 300, the system 1400 modifies radar chart 355 to display the associated value axis line 301 (and the other value axis lines 301, grouped together).

As illustrated in FIG. 3B, system 1400 highlights in red the user selected value axis 301 (although other colors may be used) when the user makes an attribute selection 350. The user may easily cycle/switch the attribute selection 350 back and forth between the other attributes 310a (initial attribute selection 350), 310g (next attribute selection 350a), 310i (next attribute selection 350b), 310h (next attribute selection 350c), and 310b (next attribute selection 350d). For each selected attribute 350 (or 350a, 350b, 350c, or 350d), the system 1400 responsively displays the corresponding cluster map 300 in the center of the radar chart 355. When the user moves from the initial attribute selection 350 to an alternate attribute selection, 350a, 350b, 350c, 350d, the system 1400 displays the cluster map 300 associated with the alternate attribute selection 350a, 350b, 350c, 350d, in the center of the radar chart 355. This allows users to mentally superimpose patterns in order to find the key that is the right tradeoff between attributes. In addition, the data objects 340 (collectively, 341a, 341b, 341c, 342a, 342b, 343, and 344) in FIG. 3B are retrieved by system 1400, similarly to the previous FIG. 3A.

Note, in either FIG. 3A or FIG. 3B, different combinations of keypad 330 and value axes 301 are possible. Also, the retrieved data objects 340 may contain actual physical map locations. This combines the power of physical maps with abstract maps, and answers questions such as: "Where would a user find a part with these attributes?"

FIG. 4 illustrates a high-level flowchart 400 of steps of a system or process 1400 embodying the present invention. In step 401, two or more cluster maps are displayed. In step 402, the end user selects at least one cluster element in a given cluster map. In step 403, each user-selected cluster element is highlighted in each of the displayed cluster maps 300, including the given cluster map and each displayed cluster map. In step 404, the value axis, respective values, and/or data objects are shown for each cluster map that are associated with each user-selected cluster element. The user may also change the cluster element selection, in order to compare attribute values between the different cluster elements.

Figure 5:
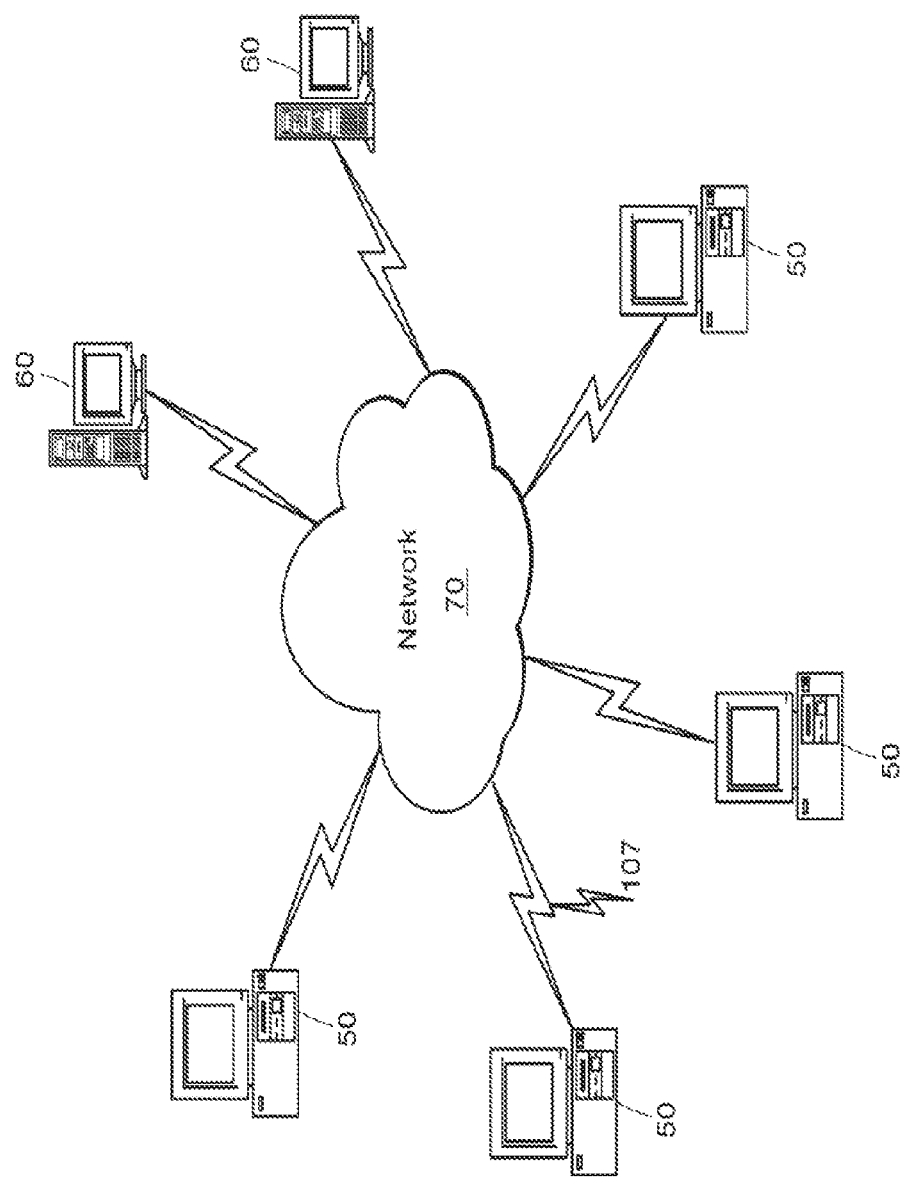
FIG. 5 illustrates a computer network or similar digital processing environment in which embodiments of the present invention may be implemented.

FIG. 5 illustrates a computer network or similar digital processing environment in which the proposed approach may be implemented.

Client computer(s)/devices 50 and server computer(s) 60 provide processing, storage, and input/output devices executing application programs and the like. Client computer(s)/devices 50 may also be linked through communications network 70 to other computing devices, including other client devices/processes 50 and server computer(s) 60. Communications network 70 may be part of a remote access network, a global or local network (e.g., the Internet), a worldwide collection of computers, Local area or Wide area networks, and gateways that currently use respective protocols (TCP/IP, BLUETOOTH™, etc.) to communicate with one another. Other electronic device/computer network architectures are suitable.

Figure 6:
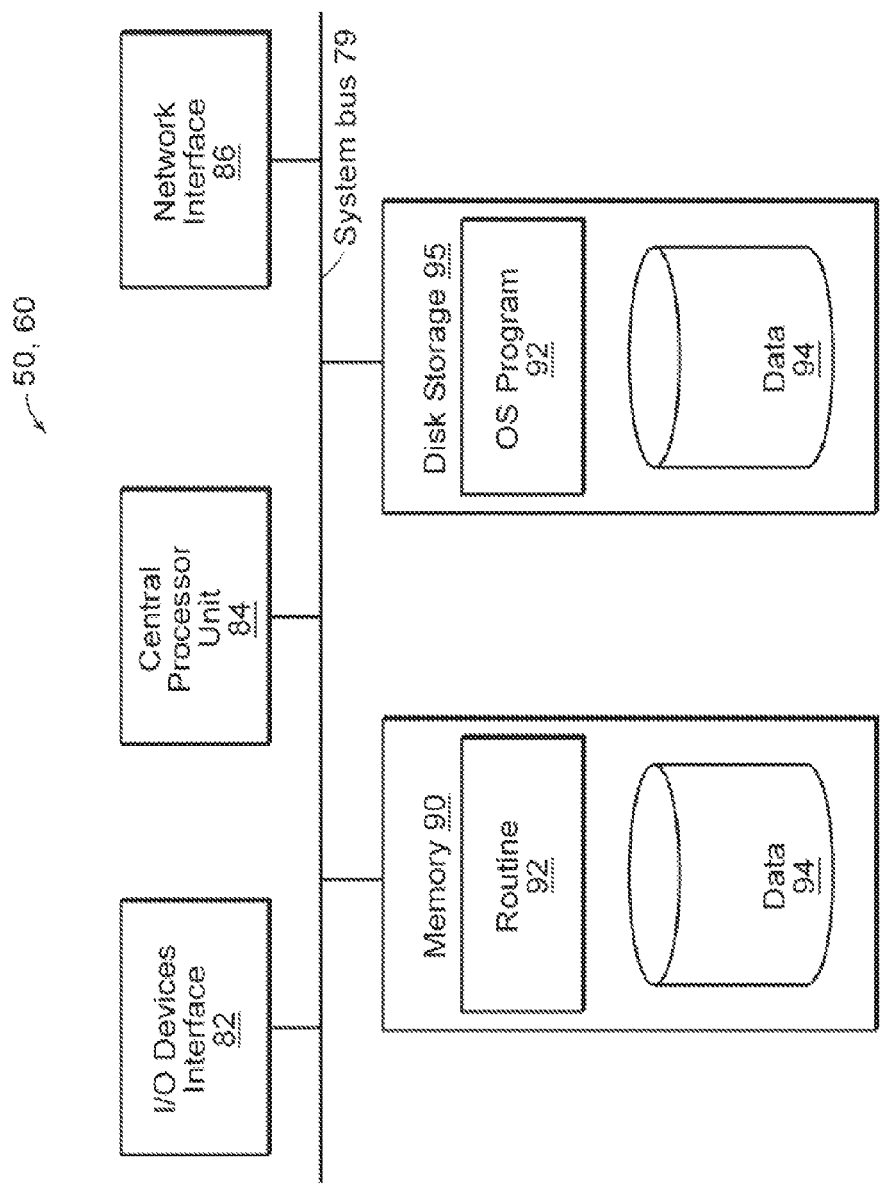
FIG. 6 is a block diagram of the internal structure of a computer in the computer network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the proposed approach (e.g., system 1400 and process steps/flow 400 detailed above). Disk storage 95 provides non-volatile storage for computer software instructions 92 and data 94 used to implement an embodiment of the proposed approach. Note, data 94 may be the same between a client 50 and server 60, however, the type of computer software instructions 92 may differ between a client 50 and a server 60. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 may be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 (shown in FIG. 5) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the proposed approach routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method providing multi-dimensional pattern-enabled searching, the computer-implemented method comprising:
displaying at least two cluster maps, each cluster map corresponding to a respective attribute, each cluster map having one or more cluster elements;
enabling an end user to select a cluster element in at least one of the displayed cluster maps;
responsively highlighting the selected cluster element in each of the displayed cluster maps; and
for each displayed cluster map, representing the respective attribute by displaying:
(i) a value axis and respective numerical data values on the value axis for the selected cluster element, the value axis indicating at least a current numerical data value of the respective numerical data values for the respective attribute of the selected cluster element, the selected cluster element highlighted in the displayed cluster map and
(ii) one or more data objects comprising graphical representations representing sequentially time-ordered numerical data values of the respective attribute of the selected cluster element, wherein the one or more data objects include a computer-aided engineering (CAE) simulation;
displaying a graphical link graphically linking each value axis together in a chain, and
for each value axis in the chain, displaying the graphical link through one or more interconnections between each value axis and each adjacent value axis, the one or more interconnections indicating selection of a same selected cluster element for a respective value axis and a respective adjacent value axis.

2. The computer-implemented method of claim 1 wherein displaying at least two cluster maps comprises displaying each cluster map as a self-organizing map.

3. The computer-implemented method of claim 1 wherein the one or more data objects include at least one of: a three-dimensional picture, a four-dimensional picture, a computer-aided design (CAD) visual, and a video.

4. The computer-implemented method of claim 1 wherein each cluster map and the value axis for the selected cluster element in each cluster map are displayed in a leaves-on-a-branch or a flower layout.

5. The computer-implemented method of claim 1 wherein displaying at least two cluster maps having one or more cluster elements comprises displaying each cluster element representative of a bin with a range of values for the respective attribute.

6. The computer-implemented method of claim 5 further comprising arranging the respective cluster elements within each cluster map in a high-to-low order.

7. The computer-implemented method of claim 5 further comprising arranging the respective cluster elements within each cluster map in a high-to-low order by one of color or shade intensity.

8. The computer-implemented method of claim 1 wherein displaying at least two cluster maps, each corresponding to a respective attribute, comprises indicating via each attribute an amount of data available about each respective cluster map.

9. The computer-implemented method of claim 1 further comprising:
selecting multiple cluster elements;
highlighting the multiple selected cluster elements in each of the displayed cluster maps; and
for each displayed cluster map, representing the respective attribute by displaying an individual value axis and respective values on the individual value axis for each of the multiple selected cluster elements highlighted in the displayed cluster map.

10. The computer-implemented method of claim 1, wherein the value axis further indicates a minimum numerical data value of the respective numerical data values for the selected cluster element and a maximum numerical data value of the respective numerical data values for the selected cluster element.

11. The computer-implemented method of claim 1 further comprising:
further highlighting the selected cluster element in a same color in each of the displayed cluster maps and representing the one or more interconnections between each value axis and each adjacent value axis with the same color.

12. A computer-implemented system providing multi-dimensional pattern-enabled searching, the system comprising a processor and a memory with computer code instructions stored thereon, the processor and the memory, with the computer code instructions, being configured to cause the system to:
display at least two cluster maps, each cluster map corresponding to a respective attribute, each cluster map having one or more cluster elements;
receive an end user selection of a cluster element in at least one of the displayed cluster maps;
responsively highlight the selected cluster element in each of the displayed cluster maps;
represent the respective attribute for each displayed cluster map by displaying:
(i) a value axis and respective numerical data values on the value axis for the selected cluster element, the value axis indicating at least a current numerical data value of the respective numerical data values for the respective attribute of the selected cluster element, the selected cluster element highlighted in the displayed cluster map and
(ii) one or more data objects comprising graphical representations representing sequentially time-ordered numerical data values of the respective attribute of the selected cluster element, wherein the one or more data objects include a computer-aided engineering (CAE) simulation;
display a graphical link graphically linking each value axis together in a chain, and
for each value axis in the chain, display the graphical link through one or more interconnections between each value axis and each adjacent value axis, the one or more interconnections indicating selection of a same selected cluster element for a respective value axis and a respective adjacent value axis.

13. The computer-implemented system of claim 12 wherein each cluster map is a self-organizing map.

14. The computer-implemented system of claim 12 wherein the one or more data objects include at least one of: a three-dimensional picture, a four-dimensional picture, a computer-aided design (CAD) visual, and a video.

15. The computer-implemented system of claim 12 wherein the displayed values are at least one of: a numerical value, a string, a parameter, a color, a symbol, a size, and a shape.

16. The computer-implemented system of claim 12 wherein the processor and the memory, with the computer code instructions, are further configured to cause the system to display each cluster map and the value axis for the selected cluster element in each cluster map in a leaves-on-a-branch or a flower layout.

17. The computer-implemented system of claim 12 wherein each cluster element represents a bin with a range of values for the respective attribute.

18. The computer-implemented system of claim 17 wherein the processor and the memory, with the computer code instructions, are further configured to cause the system to display the respective cluster elements as arranged within each cluster map in a high-to-low order.

19. The computer-implemented system of claim 17 wherein the processor and the memory, with the computer code instructions, are further configured to cause the system to display the respective clusters as arranged within each cluster map in a high-to-low order by one of color or shade intensity.

20. The computer-implemented system of claim 12 wherein the processor and the memory, with the computer code instructions, are further configured to cause the system to display, for each respective attribute, an indication of an amount of data available about each respective cluster map.

21. The computer-implemented system of claim 12 wherein the processor and the memory with the computer code instructions, are further configured to cause the system to:
select multiple cluster elements;
highlight the multiple selected cluster elements in each of the displayed cluster maps; and
represent the respective attribute by displaying an individual value axis and respective values on the individual value axis for each of the multiple selected cluster elements highlighted in the displayed cluster map.

22. A non-transitory computer readable medium having stored thereon a sequence of instructions which, when loaded and executed by a processor coupled to an apparatus causes the apparatus to:
display at least two cluster maps, each cluster map corresponding to a respective attribute, each cluster map comprising one or more cluster elements;
enable an end user to select a cluster element in at least one of the displayed cluster maps;
responsively highlight the selected cluster element in each of the displayed cluster maps; and
for each displayed cluster map, represent the respective attribute for each displayed cluster map by displaying:
(i) a value axis and respective numerical data values on the value axis for the selected cluster element, the value axis indicating at least a current numerical data value of the respective numerical data values for the respective attribute of the selected cluster element, the selected cluster element highlighted in the displayed cluster map and
(ii) one or more data objects comprising graphical representations representing sequentially time-ordered numerical data values of the respective attribute of the selected cluster element, wherein the one or more data objects include a computer-aided engineering (CAE) simulation;

display a graphical link graphically linking each value axis together in a chain, and for each value axis in the chain, display the graphical link through one or more interconnections between each value axis and each adjacent value axis, the one or more interconnections indicating selection of a same selected cluster element for a respective value axis and a respective adjacent value axis.

* * * * *